US012289436B2

(12) United States Patent
Taphanel et al.

(10) Patent No.: US 12,289,436 B2
(45) Date of Patent: Apr. 29, 2025

(54) EYEWEAR DISPLAY DEVICE FOR DISPLAYING A VIRTUAL IMAGE IN A FIELD OF VIEW OF A USER, AUGMENTED REALITY EYEWEAR DISPLAY DEVICE

(71) Applicant: Gixel GmbH, Karlsruhe (DE)

(72) Inventors: Miro Taphanel, Karlsruhe (DE); Ding Luo, Karlsruhe (DE)

(73) Assignee: Gixel GmbH, Karlsruhe (DE)

( * ) Notice: Subject to any disclaimer, the term of this patent is extended or adjusted under 35 U.S.C. 154(b) by 501 days.

(21) Appl. No.: 17/840,274

(22) Filed: Jun. 14, 2022

(65) Prior Publication Data

US 2022/0408075 A1 Dec. 22, 2022

(30) Foreign Application Priority Data

Jun. 17, 2021 (DE) ...................... 10 2021 206 209.1

(51) Int. Cl.
| | |
|---|---|
| *H04N 13/346* | (2018.01) |
| *H04N 13/344* | (2018.01) |
| *H04N 13/365* | (2018.01) |
| *H04N 13/371* | (2018.01) |

(52) U.S. Cl.
CPC ......... *H04N 13/346* (2018.05); *H04N 13/344* (2018.05); *H04N 13/371* (2018.05); *H04N 13/365* (2018.05)

(58) Field of Classification Search
None
See application file for complete search history.

(56) References Cited

U.S. PATENT DOCUMENTS

| | | | |
|---|---|---|---|
| 7,457,040 B2 | 11/2008 | Amitai | |
| 2020/0183169 A1* | 6/2020 | Peng | .................... G02B 6/0055 |

FOREIGN PATENT DOCUMENTS

JP        2016212150 A   * 12/2016

OTHER PUBLICATIONS

Machine Translation of JP-2016212150-A (Year: 2016).*
*Optical Architectures for Augmented-, Virtual-, and Mixed-Reality Headsets*, Bernard C. Kress, author, Society of Photo-Optical Instrumentation Engineers (SPIE), Bellingham, Washington State (2020) (274 pgs.).

(Continued)

*Primary Examiner* — Phu Vu
(74) *Attorney, Agent, or Firm* — Leydig, Voit & Mayer, Ltd.

(57) ABSTRACT

Disclosed is an eyewear display device for displaying a virtual image in a field of view of a user, comprising a frame unit, a line-shaped screen unit attached to the frame unit for emitting light as computer-generated image information in a first direction; at least two partially transparent beam splitter units attached to the frame unit, designed to be operated as scanner units at a defined scanner frequency, for deflecting the light emitted in the first direction from the screen unit into a second directional range corresponding to the field of view of the user when the eyewear display device is used as intended; to provide an eyewear display device for display, AR glasses, by which the virtual image is displayed in as large a sub-area of the field of view as possible and the form factor of which corresponds as closely as possible to that of ordinary glasses.

16 Claims, 8 Drawing Sheets

(56) References Cited

OTHER PUBLICATIONS

Figure 1:
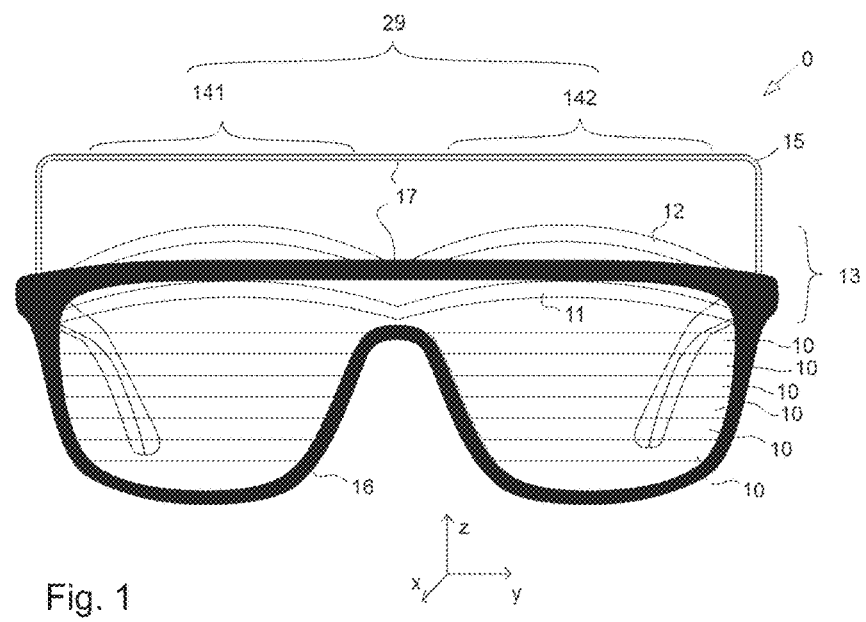

*Optical architectures for augmented-, virtual-, and mixed-reality headsets*, Bernard C. Kress, author, Society of Photo-Optical Instrumentation Engineers, Bellingham, Washington State (2020)—Summary, Table of Contents, sample pages only (13 pgs.).

\* cited by examiner

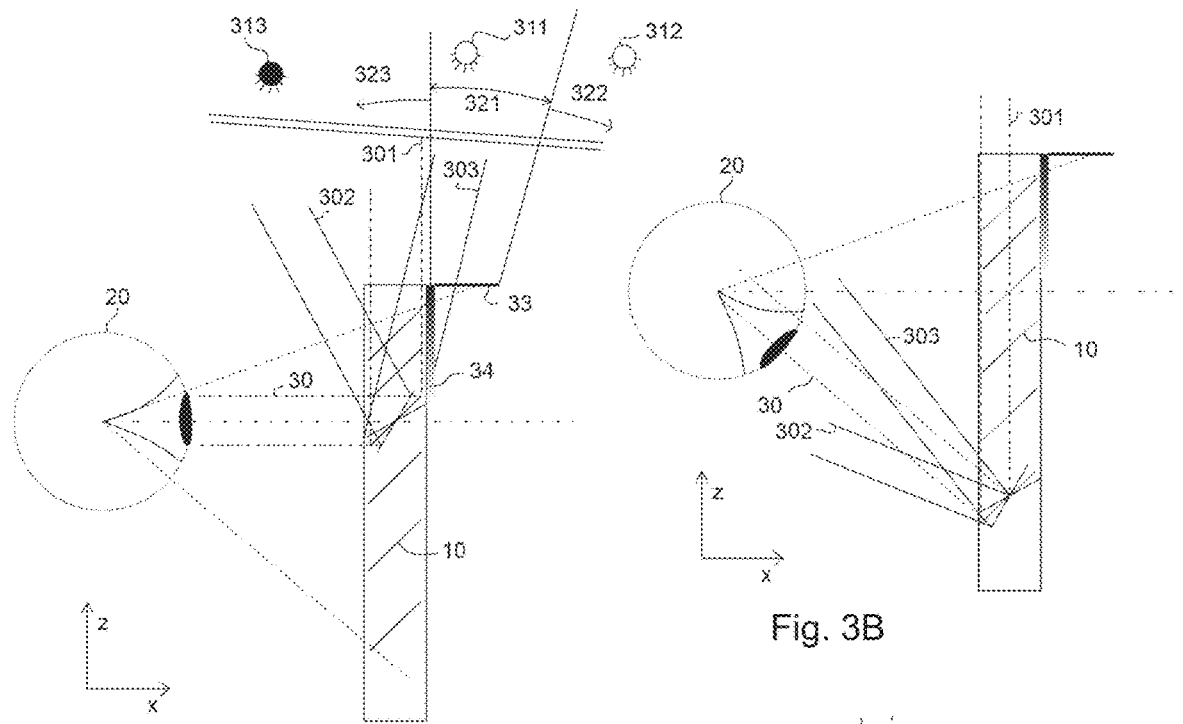
Fig. 3A
Fig. 3B
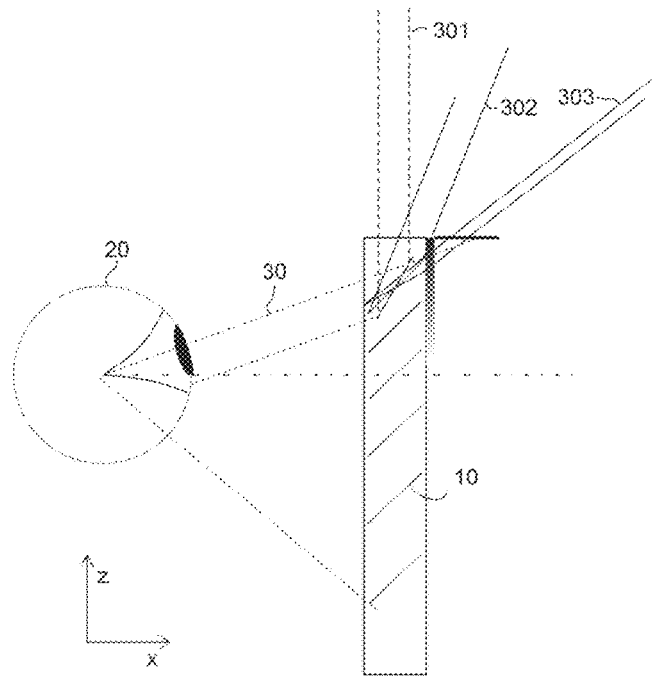
Fig. 3C

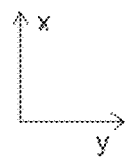
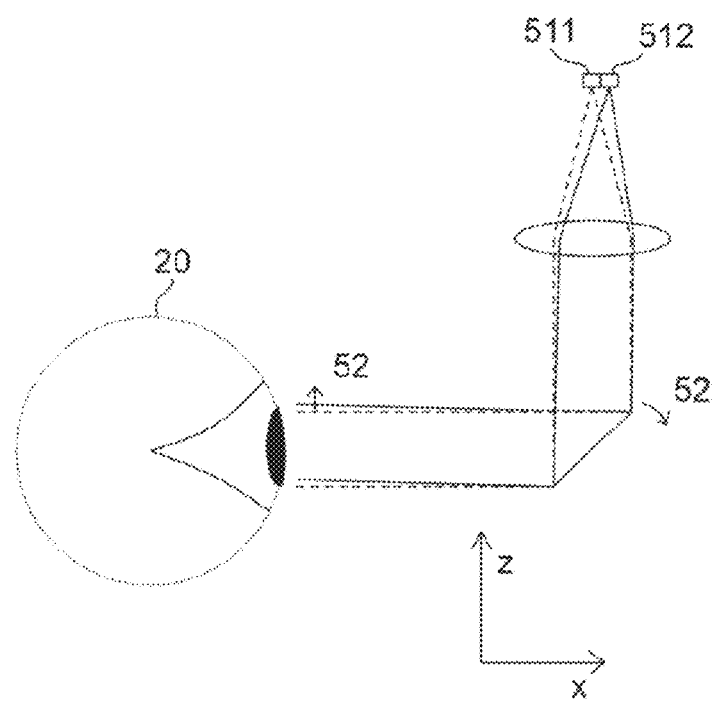
Fig. 5D
Fig. 5E

EYEWEAR DISPLAY DEVICE FOR DISPLAYING A VIRTUAL IMAGE IN A FIELD OF VIEW OF A USER, AUGMENTED REALITY EYEWEAR DISPLAY DEVICE

CROSS-REFERENCE TO A RELATED APPLICATION

This patent application claims the benefit of German Patent Application No. 10 2021 206 209.1, filed on Jun. 17, 2021, the disclosure of which is incorporated herein by reference in its entirety for all purposes.

BACKGROUND OF THE INVENTION

The invention relates to an eyewear display device for displaying a virtual image in a field of view of a user, an augmented reality eyewear display device, or augmented reality (AR) glasses for short. Said device comprises a frame unit, a screen unit attached to the frame unit for emitting light as computer-generated image information in a first direction, and partially transparent beam splitter units attached to the frame unit for deflecting in a second direction the light of the screen unit emitted in the first direction, corresponding to a field of view of the user.

A virtual image can be superimposed on the light of the natural environment, that is, the light from a field of view of a user of the AR glasses by means of augmented reality (AR) glasses. There is accordingly the possibility of deceiving human perception by embedding, "reflecting" virtual objects in the real world. Technically, light from a display is reflected as a virtual image for each eye by means of transparent beam splitter technology. It would be desirable here to be able to reflect virtual objects in the entire natural human field of view of the user. According to the current state of development, however, it has not yet been possible to design a semi-transparent beam splitter that can meet these requirements. This applies in particular to AR glasses, which should have a form factor corresponding to ordinary glasses suitable for everyday use.

A comprehensive summary of AR glasses and straight beam splitter technologies can be found in the book "Optical Architectures for AR, VR, and Mixed Reality Headsets", published by Kress in 2020. Two exemplary approaches are summarized below.

In US 2020/183 169 A1, for example, a refractive and static beam splitter array is combined with a line display and a scanning mirror. The scanning mirror, which can also be a mirror array, has the function of generating a two-dimensional image from the one-dimensional line display. The light of the line display is thus scanned and then coupled into a static beam splitter array at different locations or at different angles. Due to the critical angle for the total internal reflection and the occurrence of scattered light, virtual objects can only be reflected in this approach in a very reduced sub-area of the natural human field of view.

U.S. Pat. No. 7,457,040 B2 discloses a beam splitter based on total internal reflection. The light of an image focused to infinity is coupled into this beam part and the entrance opening of the optical system is coupled out a plurality of times by means of a plurality of semi-transparent mirrors. This results in a large exit opening, as is required for a larger usable field of view for the virtual objects. The display can accordingly be used with a comparatively small optics and entrance opening. The disadvantage here, however, is that the light intensity is significantly reduced due to the multiple reflections. Similar to the solution described in the last paragraph, the usable angular range is also clearly limited here by the critical angle for the total internal reflection.

Basically, it can be stated that reflecting waveguide beam splitters and diffractive waveguide beam splitters, which are based on the principle of total internal reflection, generally have the disadvantage that the optical path is lengthened due to the back and forth mirroring. As a result, light beams that do not run exactly on a central axis of the optical system migrate to the side in the optical system. Respective optical components must be made larger as a result, in order to maintain image quality. The system as a whole therefore becomes larger and heavier. Furthermore, an optical material having a particularly high refractive index is preferably used in such systems. However, said materials are typically comparatively heavy, which results in an increased weight for the AR glasses due to the technology. In addition, the parallel boundary surfaces, which are used for the total internal reflection, must be manufactured very precisely, which makes manufacture difficult. In addition, the approaches described, which are based on the principle of total internal reflection, require a coupling prism to avoid chromatic splitting due to their operating principle. However, such a coupling prism as a required optical element is very difficult to integrate into the design of ordinary glasses. In terms of their form factor, the known solutions deviate considerably from the usual glasses that are known from everyday life.

Accordingly, the task is to provide an eyewear display device for displaying a virtual image in a field of view of a user, AR glasses, by means of which the virtual image can be displayed in the largest possible sub-area of the field of view, if possible the entire field of view of the user, and the form factor of which corresponds as closely as possible to that of ordinary glasses.

This task is achieved by the subject matter of the independent patent claim. Advantageous embodiments result from the dependent patent claims, the description and the figures.

One aspect relates to an eyewear display device for displaying a virtual image in a field of view of a user, AR glasses for short, having a frame unit, at least one line-shaped screen unit attached to the frame unit for emitting a light as computer-generated image information in a first direction, and at least two, preferably at least three, particularly preferably at least four, partially transparent beam splitter units attached to the frame unit, the beam splitter units being designed to be operated as scanner units at a uniformly defined scanner frequency, and which are used to deflect the light emitted in the first direction from the screen unit into a second directional range, the second directional range corresponding at least partially, that is, partially or completely, to the field of view of the user when the eyewear display device is used as intended. The field of view of a user can refer in particular to the natural human field of view of the user. For example, it can be assumed to have a horizontal extent of 220° and a vertical extent of 150°. The beam splitter units in this case are partially transparent, at least in some areas, but can be non-transparent, particularly in optically non-effective areas, for example, in areas of a mechanism or electronics for moving the beam splitter units. The frame unit can comprise corresponding sub-units, for example, two bracket units for holding the frame unit on the respective ears of the user, a frame unit arranged on the two bracket units, on which frame unit the partially transparent beam splitter units can be attached and which is used for placement on a nose of the user, and an additional frame unit, to which the screen unit can be attached.

The first direction and the second directional range can each be or comprise a directional range having a plurality of similar individual directions that deviate from one another by less than a specific angular range. For example, the respective individual directions can deviate from a central main direction by less than ±90°, less than ±60°, less than ±45°, less than ±20° or less than ±5°. The deviations can also be specified depending on the direction, for example, with a larger deviation in the horizontal viewing area of the user and a smaller deviation in the vertical viewing area of the user, in particular ±90° in the horizontal viewing area and/or in particular ±25° in the vertical viewing area. The relationships specified for the first direction or the second directional range, that is, for example, the first direction being perpendicular to the second directional range, can then each relate to the corresponding central main directions. The respective directions or set of directions are preferably disjoint, that is, a single direction that belongs to the first direction cannot belong to the second direction range and vice versa. In particular, the first direction is or captures a vertical direction in the gravitational field, a vertical direction, and/or the second directional range a horizontal direction in the earth's gravitational field as the main direction. The vertical direction is preferably also the main direction of the first direction or first set of directions.

Correspondingly, the first direction and the second directional range are basically transverse to one another, in particular at least substantially perpendicular to one another. Here and in the following, "substantially" is understood to mean "up to a predetermined deviation", for example, a deviation of ±35°, ±15° or ±5°. The first direction is therefore different from the second directional range. The described definition of "transverse" is generally applicable here and, mutatis mutandis, also applies to "along" as substantially parallel.

The beam splitter units can be implemented as scanner units, for example, in that the eyewear display device also comprises a control unit which is electronically coupled to the screen unit and the beam splitter units and controls the different coupled units accordingly. In this case, the coupling preferably takes place via a wired connection, but can also take place wirelessly. The synchronization can be implemented by means of software or an electrical coupling of the actuators of the individual beam splitter units. A single actuator or two symmetrically arranged actuators can be provided for each beam splitter unit. Alternatively, mechanical coupling is also possible, especially with the rotary scanner units introduced below.

The fact that the beam path for the virtual image, starting from the eye of the user, first impinges on a scanning and partially transparent beam splitter unit and is then directed to a line-shaped screen unit, results in a number of advantages in the combination presented. A large field of view can primarily be realized while maintaining the form factor of everyday glasses in this way. The plurality of scanner units scanning at a uniformly defined scanner frequency, that is, scanning synchronously, has the effect of reducing a spatial dimension of the imaging in the beam path. As a result, the line-shaped screen unit, for example, a linear display, is sufficient and a two-dimensional display does not have to be imaged. Due to the human physiological boundary conditions and due to the design of the eyewear display device as a head-worn eyewear display device, a display can be larger in a horizontal transverse direction, that is, from right to left or left to right, than in a horizontal x-direction, that is, away from the user or towards the user, without having to deviate from the form factor of ordinary glasses.

It is also advantageous for a lens element having one or more optical lenses, an optic, to be able to be integrated between the screen unit and the partially transparent beam splitter units, the optic appearing transparent in the x-direction without distortion, since said optic can be formed as plane-parallel glass in the x-direction and an optical effect of the lens element occurs due to the curved shape chosen in the vertical and transverse, n-and y-directions and the use of a material having a refractive index (only or mainly) in the vertical, z-direction perpendicular to the x- and y-directions. This in turn has the advantage that comparatively large lens elements can be used, which opens up an enlarged field of view for the virtual objects that can be faded in, and at the same time, the face of user can be seen behind the optics, that is, the lens element, remains recognizable. This last aspect is of particular relevance since an important application of the eyewear display device presented is telecommunications, in which the facial expressions of the user should remain as unobstructed and recognizable as possible. Furthermore, it is advantageous that a high level of transparency can be implemented using the AR glasses described by the specific selection of the partial mirror coating of the beam splitter units. In particular, the structure described can ensure that no light from the line-shaped screen unit is directed away from the eye into an environment surrounding the user. Some AR optics from the prior art have this disadvantage, in which a partial beam path which leads away from the eye leads to the unwanted effect of eyes perceived as glowing by observers in the environment of the user. A further consequence of this is that the natural eyes of the user can no longer be seen from the outside, which is undesirable in the field of telecommunications.

The line-shaped screen unit and thus the selected elongated forming of the associated components in the y-direction and small forming in the x-direction also enables further advantages in terms of weight and weight distribution, in particular the center of mass, of the eyewear display device. In order to be able to wear and feel AR glasses as ordinary glasses, the weight must not be too great. The approximate limit is generally considered to be 80 grams, typical weights for everyday glasses rather being in the range of 40 grams. Increased weight leads to pressure points on the nose and ears, which can become painful after a while. On the other hand, the technical implementation of a center of mass between the ear and the nose is important, since this is the only way to distribute the weight evenly between the ears and the nose. It is therefore advantageous for the eyewear display device to extend as little as possible in the x-direction. This is possible using the eyewear display device described since the main extension direction of the line-shaped screen unit extends along the y-direction close to the head of the user. Since the partially transparent beam splitter units also have a main extension direction along the y-direction close to the head of the user, the optical functional principle corresponds to the physiological and communicative conditions or accommodates them.

In an advantageous embodiment, it is provided that the beam splitter units are designed with a reflection surface for the light emitted by the screen unit, in each case to rotate or oscillate about an axis of rotation transverse, that is, substantially perpendicular, to the first direction. The axis of rotation can, for example, run parallel to the y-direction. Accordingly, the beam splitter unit and/or reflection surface preferably has a main extension direction running parallel to the axis of rotation.

In this case, the beam splitter units can be designed, for example, as oscillation scanner units with resonantly oscillating mirrors as partially transparent reflection surfaces. Each mirror can be equipped with its own spring element. The reflection surface belonging to a respective beam splitter unit then oscillates about the axis of rotation when used as intended, so that the second directional range is predetermined by the angular ranges between the respective end positions of the reflection surfaces of the beam splitter units. In this case, the rotational speed of the reflection surfaces is zero in the end positions. The partial transparency can be implemented technically, for example, by using a transparent material for the beam splitter units, the material being optionally provided with a coating, for example, a glass with a dielectric coating. Alternatively, a polka-dot approach can also be chosen, in which holes are introduced into a reflective surface in a predetermined distribution ratio. This has the additional advantage that the air is damped is reduced when oscillating. However, a plurality of known oscillating mirrors, partially transparent mirrors, and respective drive concepts are possible, as are known from the prior art. For example, the beam splitter units can also be designed as rotary scanner units, the respective reflection surfaces of which rotate about the axis of rotation. In this case, the second directional range is then specified by the widths of the respective reflection surfaces in a plane perpendicular to the axis of rotation. Scattered light at the edges of the reflection surfaces can be avoided by blackening the edges and/or grinding the edges such that no edges are visible from the perspective. Disadvantages of the design of the beam splitter units as rotary scanner units compared to the design as oscillation scanner units are the angular momentum that occurs and the mechanics that may produce noise. The simplified actuation and the constant angular velocity are advantageous.

In a further advantageous embodiment, it is provided that the beam splitter units are designed to be in a (fixed) predetermined phase relation to one another during operation at the uniform scanner frequency. In this case, in particular for two or more groups of beam splitter units, which preferably each consist of beam splitter units that are not immediately adjacent, phases which deviate from one another are specified. A phase offset for the beam splitter units is therefore fixedly specified between the respective groups such that the beam splitter units of each group have reflection surfaces running permanently or constantly parallel to one another due to identical phases, though the reflection surfaces of beam splitter units in different groups do not run parallel to one another permanently or constantly. The beam splitter units of a group are therefore in the same phase during operation. Such a group can also comprise all beam splitter units, so that all reflection surfaces run parallel to one another permanently. If, for example, when divided into two groups, the beam splitter units are controlled such that all beam splitter units oscillate at the same scanner frequency, but the beam splitter units of one group have a phase shift relative to the beam splitter elements of the other groups.

This has the effect that the line-shaped screen unit can never be observed by the user via two adjacent beam splitter units at the same time. The virtual image, that is, the computer-generated image information, can thus be changed by means of software such that an artifact-free virtual image is created. The artifacts that can be so avoided arise when the line-shaped screen unit is not imaged to infinity, for example, with the above-mentioned lens element between the screen unit and the beam splitter units. In this case, a vertical offset of the beam splitter units has the effect that the virtual image is displayed with a vertical shift. Correspondingly, if all the beam splitter units are operated with the same phase, partial areas of the vertical image overlap. Double images, the artifacts mentioned and avoidable with grouping of the beam splitter units arise as a result. The division into two (or more) groups of beam splitter units in combination with an angle-dependent vertical shift in the computer-generated image information, the artifact correction, thus prevents the formation of double images. The artifact of an enlargement can also be corrected analogously.

In a further advantageous embodiment, it is provided that the beam splitter units are arranged one behind the other when viewed in a vertical direction, in particular the first direction, so that light emitted by the screen unit impinges on a respective beam splitter unit and has previously passed through (transmitted) those of the other beam splitter units. which are arranged between the respective beam splitter unit and the screen unit. In this case, a distance between the next adjacent beam splitter units preferably increases from top to bottom, that is, with increasing distance from the screen unit.

This is not only advantageous for the form factor of the eyewear display device, but it is also easy to choose the transparency or reflectance of the semi-transparent beam splitter units, which leads to a homogeneous intensity of the virtual image in the vertical direction. In this case, an intensity $I_{AR}$ of the virtual image is composed of the intensities of the individual partial mirrors $I_1$ to $I_i$, which have a reflectance R and thus a transmission of (1-R). Constant intensity $I_D$ of the screen unit results in different partial mirror coatings for the exemplary number of i=6 beam splitter units with a constant intensity of the virtual image $I_{AR}=I_1=I_2=\ldots=I_6=\text{const.}$ and $I_1=R_1*I_D$, $I_2=(1-R_1)*R_2*I_D$, $\ldots I_6=(1-R_1)*(1-R_2)*(1-R_3)*(1-R_4)*(1-R_5)*R_6*I_D$, and thus, for example, $R_6=30\%$, $R_5=23\%$, $R_4=19\%$, $R_3=16\%$, $R_2=14\%$ and $R_1=12\%$. In this case, the same amount of light per partially transparent beam splitter is reflected to the eye of the user. However, there is a reduction in transmission for the user to see through and thus perceive the real environment, which some users may find uncomfortable under certain circumstances. Alternatively, one can also work with a constant reflectance of R=20%, for example, and additionally the intensity of the display as a function of the vertical light, that is, an angular position of the beam splitter units, can be varied such that the virtual image is perceived at a constant intensity over the entire vertical field of view.

In another advantageous embodiment, it is provided that the first direction, when the eyewear display device is used as intended, is the vertical direction and the line-shaped screen unit is arranged in the vertical direction above the beam splitter units. This implements the above-described advantages of form factor, weight, and the greatest possible opening up of the field of view for the virtual image particularly well.

In a further advantageous embodiment, it is provided that the length as the main extension direction of the line-shaped screen unit is at least one order of magnitude, that is, is greater by a factor of 10, in particular by at least 1.5 orders of magnitude, that is, by a factor of 50, than a width of the line-shaped screen unit running transversely to the length. In particular, the width and length of the screen unit here run transversely to the first direction. This design also has the advantage that the advantages described with regard to form factor, weight distribution and the field of view opened up for the virtual image can be achieved in a particularly expedient manner.

Another advantageous embodiment provides that the line-shaped screen unit comprises a pixel line, in particular exactly one pixel line, of picture elements (pixels), which are each formed by different color sub-pixels arranged alternately along the line. The color sub-pixels (sub-pixels) can be or comprise red, green or blue sub-pixels, for example. For example, the color sub-pixels may be arranged in an R-G-B-R-G-B . . . scheme. A particularly narrow line-shaped screen unit can thus be implemented. The screen unit can also comprise a plurality of such pixel lines.

In another advantageous embodiment, it can be provided that the line-shaped screen unit has a plurality of (in particular parallel) sub-pixel lines of respective color sub-pixels. A specific color, for example, red or green or blue, is assigned to each of the sub-pixel lines. The pixels of a sub-pixel line therefore have a (single) color, thus, for example, for a red sub-pixel line, they are arranged in an R-R-R- . . . scheme. In particular, the line-shaped screen unit can have exactly one of each of said sub-pixel lines with color sub-pixels of one color or of at least one of said sub-pixel lines more or less than of the other sub-pixel lines. Thus, respective color sub-pixel bands can be arranged as monochromatic sub-pixel lines along the main extension direction of the screen unit. With different numbers of sub-pixel lines for each specific color, technological differences in the luminosity of the respective color sub-pixels of the sub-pixel lines can be compensated for, for example, so that, for example, less efficient blue sub-pixels of the blue sub-pixel line can be compensated for by a further blue sub-pixel line present in the line-shaped screen unit. Overall, greater intensities of the light emitted by the line-shaped screen unit can be implemented by means of a plurality of pixel or sub-pixel lines.

A plurality of locally offset pixel lines or sub-pixel lines are scanned by the beam splitter units with a time offset which, however, is too small for a human user to perceive. If the time offset corresponding to the local offset of the different lines determined by the scanner frequency is taken into account in a time-shifted actuation of the lines of the screen unit, it is possible to display color information for each resulting pixel in the virtual image as an overlay of the color information of the different lines.

In a further advantageous embodiment, it is provided that the at least one line or the sub-pixel lines (of one type) of the line-shaped screen unit are implemented a plurality of times in the form of respective instances, in particular 8 times. Each instance of the pixel line or sub-pixel line is designed to be operated with a maximum brightness that is specified differently specifically for each instance. Accordingly, when used as intended, the eyewear display device of each pixel or sub-pixel of an instance can only be switched between two operating modes, namely a switched-off "Off" operating mode and a switched-on "On" operating mode with the specified maximum brightness. In this case, the maximum brightness can be specified dynamically fixed, that is, unchangeable, or variable in a scheme, for example, in a so-called bit-plane scheme. The brightness of all pixels of an instance (line) can thus be switched globally, for example, via a current, so that brightness control does not have to be controlled via regulation of the pulse width, which would be an alternative. Accordingly, only one on or off has to be implemented per pixel and the brightness can be set globally for the entire respective instantiating line. The brightness of a virtual pixel then corresponds to the summed brightness of the pixels assigned to the virtual pixel in the different instances. This considerably simplifies the actuation at the high switching frequencies that occur anyway in the screen unit in the approach described here. A further advantage is that if LEDs are used in the screen unit, they are only ever actuated at maximum power for a short time, so that a higher maximum intensity can be achieved for a short time. This can be implemented using the described flexibly specified maximum brightness scheme, for example, by successively implementing a brightness sequence with 1, 128, 2, 64, 4, 32, 8, 16 as the respective maximum brightness values for the different instances. For each scanning process, each instance then has a maximum brightness that is individually predetermined by the scheme and that is predetermined in the next scanning process by the next maximum brightness value in the bit-plane scheme.

In a further advantageous embodiment, it is provided that a plurality of line-shaped screen units running at least substantially parallel in their respective main extension direction are attached to the frame unit, the screen units each being arranged at a different distance in the vertical direction from the beam splitter units and/or the lens element arranged between the beam splitter units and the screen unit, which is introduced further below. The line-shaped screen units can be positioned by a respective shift in the x- and z-direction without mutual covering occurring. This has the advantage that the so-called vergence-accommodation problem of AR glasses can be eliminated. The vergence-accommodation problem results from the fact that AR glasses are designed as 3D glasses and can correspondingly fade in virtual objects positioned at any distance. However, the screen unit always has a focal position at a defined distance. As a result, there is only exactly one distance at which virtual objects can be displayed, at which the eye is also focused on this natural distance. Especially with AR glasses, which also enable an undisturbed view of the natural environment, users notice when real and virtual objects are positioned at the same distance with regard to their 3D information, but have to be focused at a different distance around the virtual object to be able to see an object sharply at this distance. With the use of two or more of the line-shaped screen units running along one another, a different display can thus be used, depending on the distance from the virtual object. The use of a plurality of line-shaped screen units at different distances can lead to artifacts, which, however, are remedied by specifying two or more groups of beam splitter units which, as described above, are in a respective predetermined fixed phase relationship to one another. Due to the limited depth of field of the human eye, just a few screen units are sufficient to resolve the vergence-accommodation problem.

A further advantageous embodiment provides that a lens element, in particular having or made of a dispersion lens, is arranged between the beam splitter units and an eye position which is occupied by an eye of the user when the eyewear display device is used as intended, and/or a lens element, in particular having or made of a focusing lens, is arranged between the beam splitter units and an environment which can be viewed by the user through the beam splitter units when the eyewear display device is used as intended. A dispersion lens can therefore be arranged on the inside of the eyewear display device and a focusing lens can be arranged on an outside of the eyewear display device. The lens element on the inside, that is, between the beam splitter units and the eye position, can ensure that the virtual image is brought closer to the user. The focusing lens attached to the outside can compensate for this effect for real objects with a corresponding inverse focal length, so that the view through the beam splitter to the natural environment is not distorted by the lens elements attached to the inside. The lens element attached to the inside thus enables beam paths within the AR glasses that are imaged to infinity and therefore do not lead to artifacts when the beam path is viewed through two adjacent beam splitters at the same time, while all beam splitters oscillate in parallel and at the same time, the virtual image is perceived at a finite distance due to the lens element. Alternatively, phase-shifted scanning by the beam splitter units is also possible, that is, by specifying two or more groups of beam splitter units from non-neighboring beam splitter units having different phases that are fixedly specified for said groups as described above, different distances can be specified for virtual objects even without the lens elements described.

A further advantageous embodiment provides that a further lens element, in particular having or consisting of a focusing lens, is arranged between the beam splitter units and the screen unit. In particular, the lens element comprises two plane-parallel boundary surfaces running along the first direction, preferably along the y- and z-direction. The further lens element is thus optically active with regard to the light emitted by the screen unit, but optically neutral with regard to light coming from or into the environment according to the second directional range, so that the further lens element is transparent to a person opposite the user, as known from window panes, without distortion. This means that human facial expressions behind the optics are easier to recognize, which is particularly advantageous for telecommunications, as already described.

In a further advantageous embodiment, a diaphragm unit attached to the frame unit is provided. The diaphragm unit comprises a diaphragm running transversely to the first direction and/or a diaphragm parallel to a plane spanned by the beam splitter units, the y-z plane, in order to shield light of the screen unit deflected by the beam splitter units against light incident from directions adjacent to the first direction. Namely, such light, as scattered light, has the potential to deteriorate the virtual image. Depending on the orientation of the eye of the user, straight ahead, above or below, lights from different directions adjacent to the first direction are particularly harmful. Said lights can be shielded particularly effectively using the two diaphragms described.

The features and feature combinations mentioned above in the description, also in the introductory part, and the features and feature combinations mentioned below in the description of the figures and/or shown alone in the figures, can be used not only in the combination specified in each case, but also in other combinations, without departing from the scope of the invention. The invention is therefore also to be considered to comprise and disclose embodiments that are not explicitly shown and explained in the figures, but that result from the explained embodiments and can be generated by separate combinations of features. Embodiments and combinations of features are also to be regarded as disclosed which therefore do not have all the features of an originally formulated independent claim. Furthermore, embodiments and combinations of features, in particular through the embodiments presented above, are to be regarded as disclosed which go beyond or deviate from the combinations of features presented in the back references of the claims.

BRIEF DESCRIPTION OF THE SEVERAL VIEWS OF THE DRAWING(S)

Figure 2:
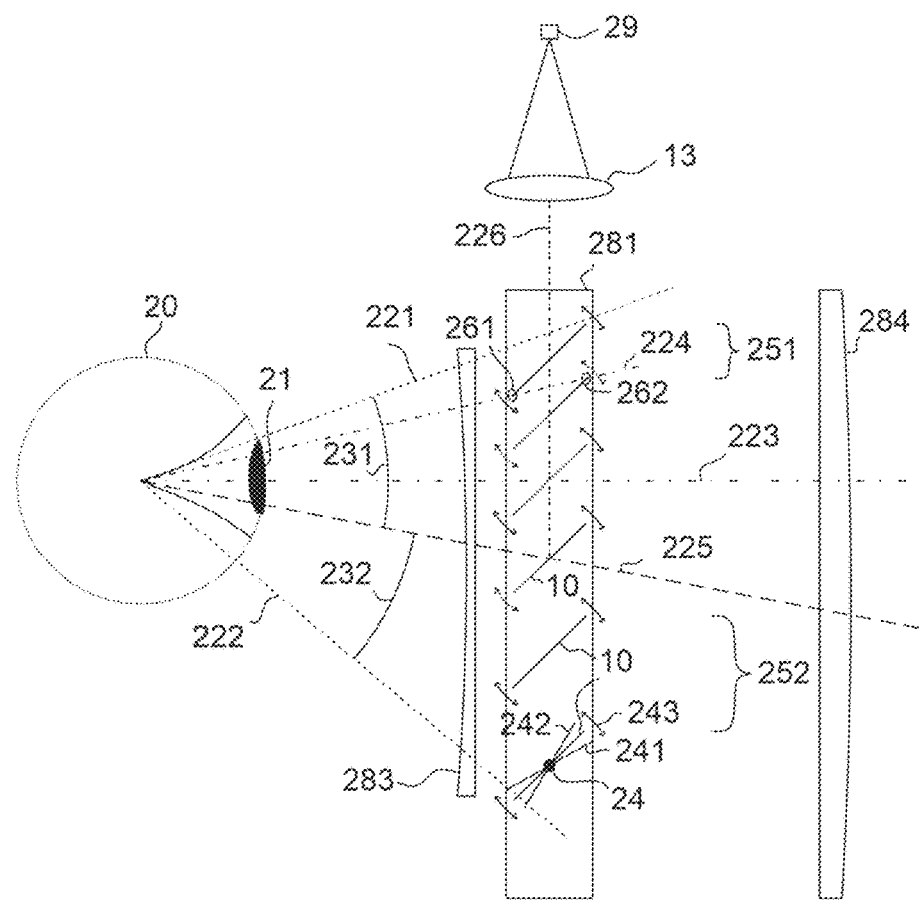
Figure 4A:
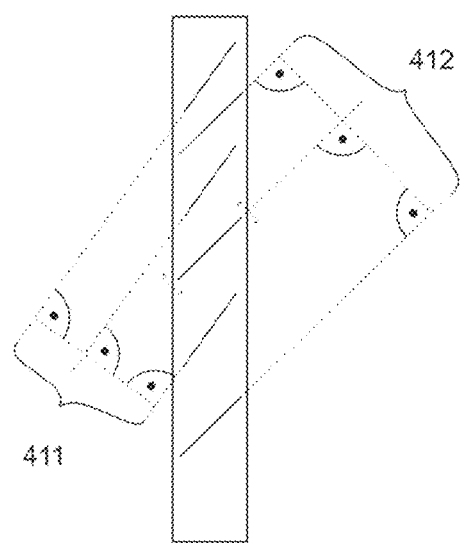
Figure 4B:
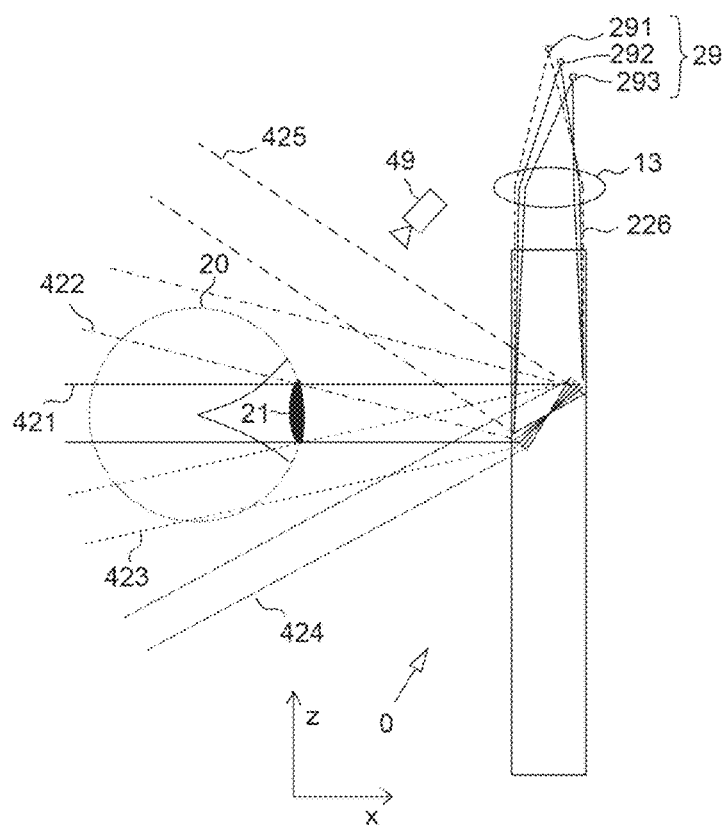
Figure 4C:
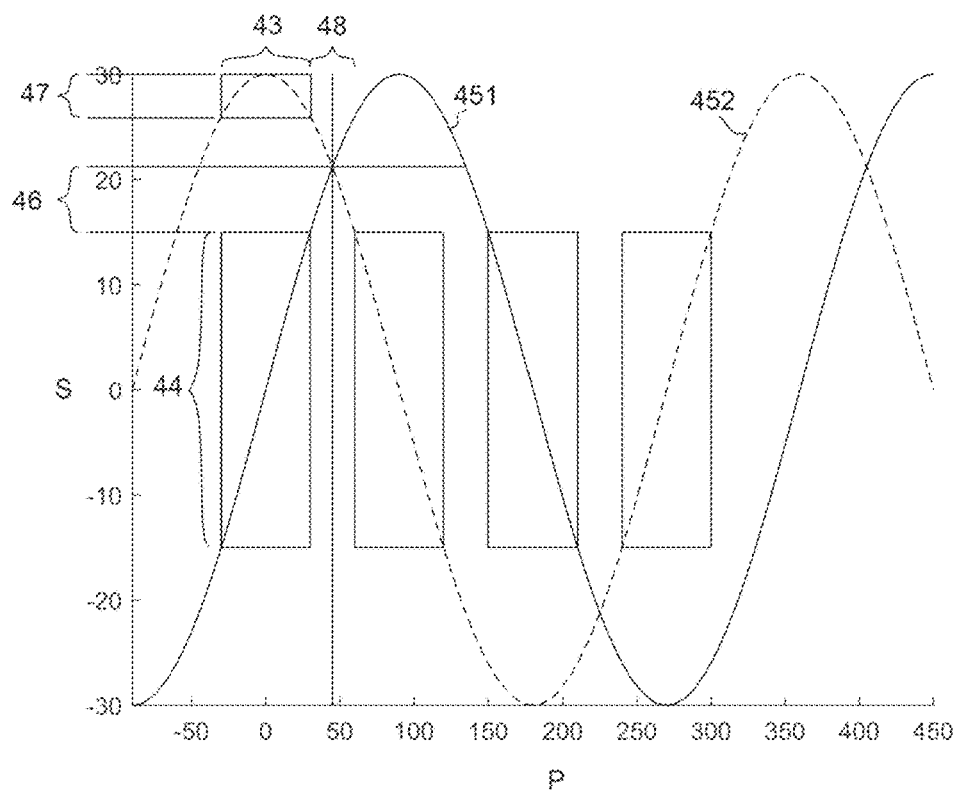
Figure 6:
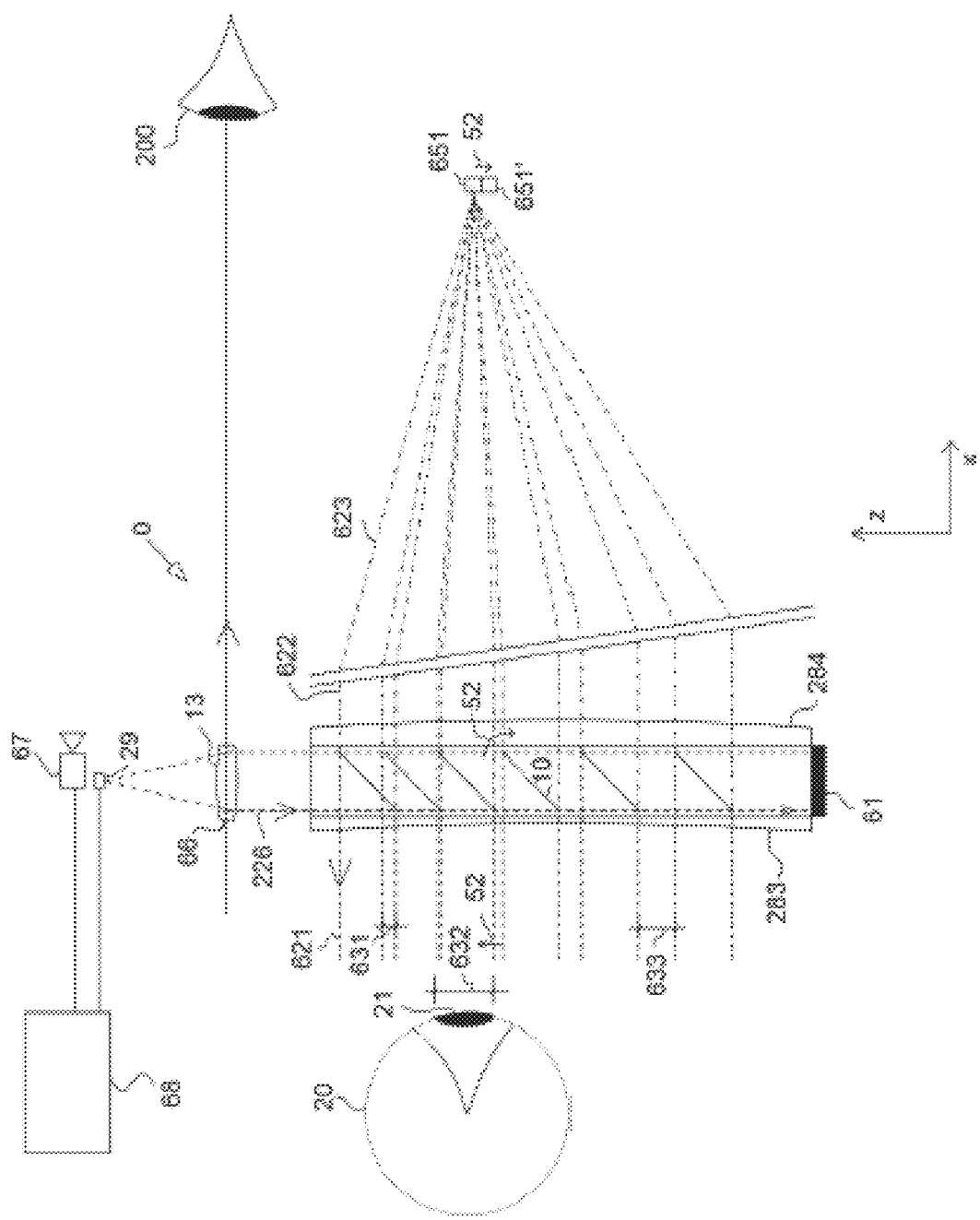
Figure 7A:
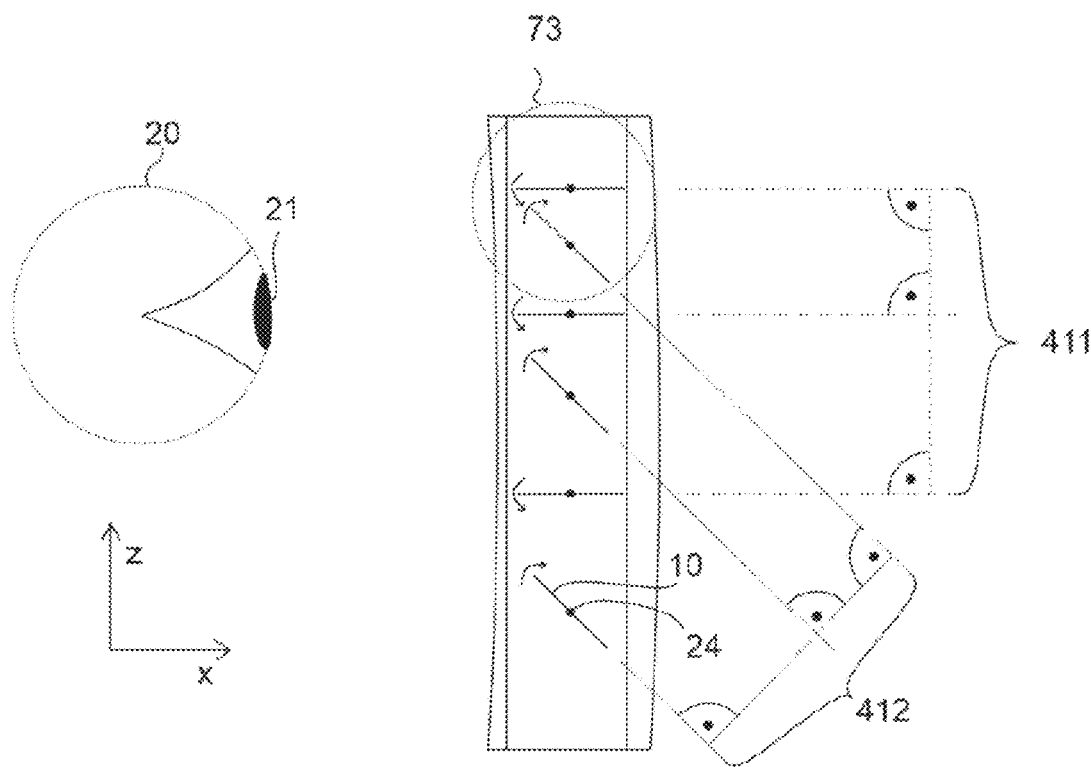
Figure 7B:
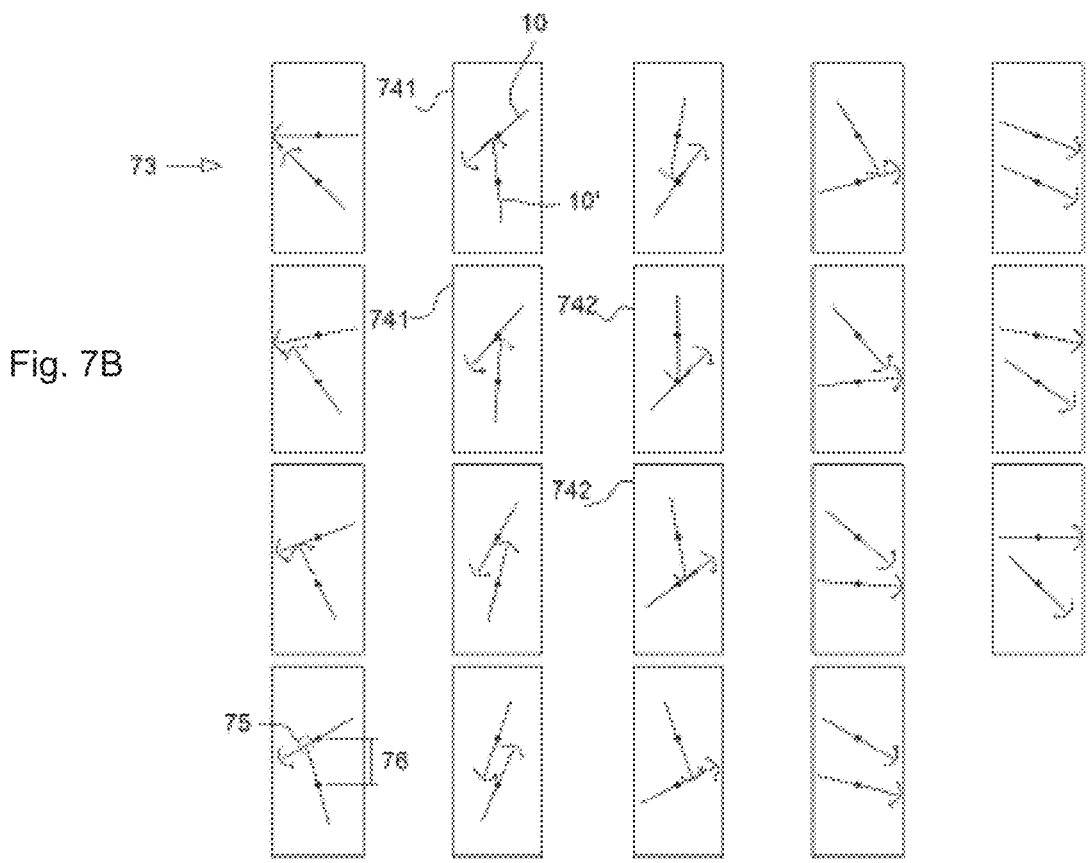
Figure 7C:
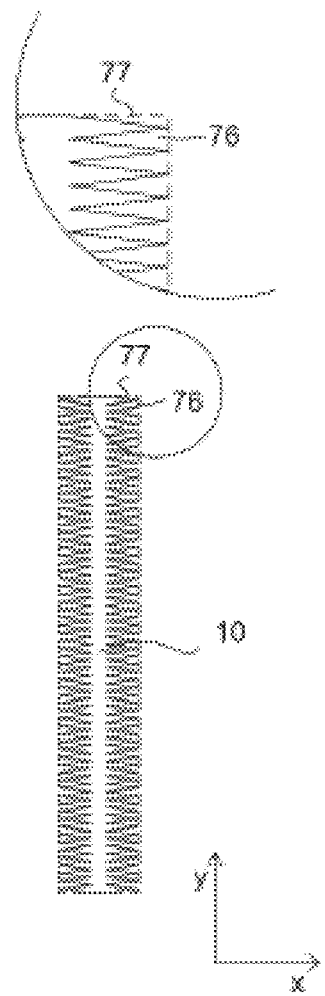

The subject according to the invention is to be explained in more detail with reference to the schematic drawings shown in the following figures, without wishing to restrict it to the specific embodiments shown here. Shown are:

FIG. 1 an embodiment of an eyewear display device for displaying a virtual image in a field of view of a user in a perspective front view;

FIG. 2 the embodiment from FIG. 1 in a schematic side sectional view;

FIGS. 3A-3C exemplary situations for scattered light deteriorating the virtual image;

FIGS. 4A-4C different details of a further embodiment of an eyewear display device;

FIGS. 5A-5E different embodiments of line-shaped screen units;

FIG. 6 an overview of a further exemplary eyewear display device;

FIGS. 7A-7C an illustration of an embodiment of an eyewear display device having rotary scanner units.

Identical and functionally identical elements are provided with the same reference symbols in the figures.

DETAILED DESCRIPTION OF THE INVENTION

FIG. 1 shows an embodiment of an eyewear display device for displaying a virtual image in a field of view of a user. The eyewear display device 0 comprises a frame unit 17 with, in this case, a frame unit 16 and an additional frame heater 15. In the embodiment shown, a line-shaped screen unit 29 is arranged on the frame unit 17, in this case the frame unit 15, of which two partial areas 141, 142 are assigned to the right and left eye 20 (FIG. 2) of the user. The line-shaped screen unit 29 is used to emit light along a beam path 226 (FIG. 2) as computer-generated image information in a first direction, here the negative z-direction. The eyewear display device 0 also comprises a plurality of partially transparent beam splitter units 10 attached to the frame unit 17, in this case the frame unit 16, the beam splitter units being designed to be operated as scanner units at a uniformly defined scanner frequency in order to deflect the light emitted by the screen unit 29 in the first direction, the negative z-direction, into a second directional range, which corresponds to the field of view of the user when the eyewear display device 0 is used as intended. In the present case, the second directional range runs substantially along the negative x-direction.

In the present case, a further lens element 13, here a so-called pancake optic with two lenses 11, 12, is arranged between the beam splitter units 10 and the screen unit 29. In the drawing plane, that is, in the y-z plane, the lens element 13 comprises two plane-parallel boundary surfaces (consequently running along the first direction), so that a viewing third party does not experience a distorted reproduction of the facial expressions of the user. The beam splitter units 10 are in a vertical direction, viewed here the positive z-direction, one behind the other, that is, arranged one above the other in the z-direction, so that light emitted by the screen unit 29 impinges on a respective beam splitter unit 10, the light having previously passed through those of the other beam splitter units 10 which are arranged between the respective beam splitter unit 10 and the screen unit 29. As the distance from the screen unit 29 increases, the distance between the beam splitter units 10 also increases in the example shown.

In the above example, six partially transparent beam splitter units 10 designed as scanner units are depicted for each eye, the beam splitter units having a respective axis of rotation 24 (FIG. 2) along the y-axis. The beam splitter units 10 are designed, for example, with a corresponding control unit, to be operated at a uniformly defined scanner frequency so that the individual scanner units with assigned partially transparent reflection surfaces oscillate synchronously with one another. In this case, synchronous means that the phase of the beam splitter units relative to one another is constant. The further lens element 13 images form the line-shaped screen unit 29 such that said screen unit can be seen by the eye of the user 20 (FIG. 2) via the partially transparent beam splitter units 10 in a large part of the natural human field of view. The field of view that can be used for the virtual image is determined horizontally by the extension of the beam splitter units 10, the optics 13 and the line-shaped screen unit 29 in the y-direction. In the vertical direction, the field of view that can be used for the virtual image is determined by the mechanical deflection of the scanner units 10, their width transverse to their main extension direction and by the number of scanner units 10 used, since each individual scanner unit can only cover a partial area of the vertical field of view.

In the example shown, the further lens element 13 is so formed that through the lenses 11, 12 from the frontal direction, that is, can be looked through without distortion in the negative x-direction. This is possible since the lenses 11, 12 are cut out like strips in the x-direction, that is, have a significantly longer forming in the y-direction than in the x-direction. "Significant" can be understood here, for example, as a difference of at least one order of magnitude, for example, an extension of 6 mm in the x-direction and 70 mm in the y-direction. In the present example, the design of the pancake optics for the further lens element 13 is selected as an example and can also be replaced by other optics.

FIG. 2 shows a schematic side sectional view of the eyewear display device from FIG. 1. The eye 20 of the user looks through a pupil 21 at the arrangement of the beam splitter units 10 designed as scanner units and thus scanning, which each rotate about their axis of rotation 24. The beam splitter units 10 have a mechanical angular range 243 between two end positions 241, 242. Said mechanical angular range 243 requires an optical angular range 231, 232 which, as a second directional range, corresponds to the field of view of a user usable through the virtual image. In principle, the mechanical angular range 243 can also be selected to be larger here, the line-shaped screen unit 29 only being used if a beam path runs within the boundaries 221, 222. In the present case, the boundaries 221, 222 correspond to the natural human field of view of the user. This viewing area is arranged symmetrically around a central main direction 225, which should preferably also be the center of the mechanical scanning or angle area 243. Optimally, the orientation of the partially transparent beam splitter units 10 in the rest position is chosen such that parallel light is deflected along the beam path 226 out of the screen unit 29 in the direction 225. The beam splitter units 10 are synchronous, that is, all operated at the same scanner frequency. As explained further below in FIGS. 4A-4C, a forming with a relative phase shift between individual beam splitter units 10 can be selected, or, as shown in the present figure, without phase shift between different beam splitter units 10. In this latter case, the reflection surfaces of all partially transparent beam splitter units 10 are arranged in parallel.

In this example, the beam splitter units 10 are positioned one above the other in the z-direction at a vertical distance 251, 252, which differs depending on the height in the z-direction, according to the vertical position in the field of view. For example, the beam splitter units 10 can be positioned so close to one another that a viewing beam path 224 from the center of rotation of the eye 20 or eyeball intersects the lower edge 261 of an upper beam splitter unit 10 and at the same time intersects the upper edge 262 of a lower beam splitter unit 10. However, narrower distances and also larger distances are also conceivable. In closer arrangements, a viewing beam path can be deflected by two beam splitter units 10 at the same time. So that this does not lead to image artifacts, the further lens element 13 must be designed in the present case such that light rays are imaged to infinity, that is, there is a parallel light bundle to be deflected. The virtual image can then be moved back to a finite virtual distance by a concave lens element 283 between the user and the beam splitter units 10. So that the view through the beam splitter 10 onto the real objects in the natural environment is not distorted by the lens element 283, this can be corrected again by a lens element 282 having an inverse focal length on an outside of the eyewear display device 0. The lens elements 283 and 284 are no longer necessary if phase-shifted scanning is used, as is explained in more detail in FIGS. 4A-4C.

In FIG. 3, beam paths are considered which, as scattered light, have the potential to degrade the virtual image.

FIG. 3A shows a situation with a horizontal straight-ahead view, as a result of which the eye 20 focuses on a pixel of the virtual image that is visible in the horizontal direction, x-direction. Since the beam splitter units 10 scan the line-shaped screen unit at a scanner frequency of, for example, 50 hertz, other light sources 311, 312 and 313 of the natural environment are also superimposed on the observed virtual pixel for a short point in time according to the beam path 30 in a scan cycle. Said light sources 311, 312 and 313 of the natural environment can be divided into three angular ranges 321, 322 and 323.

Light sources 313, which are located to the left of the vertical in the angular range 323 in the illustration shown, and are therefore located closer to the eye 20 than the screen unit 29 viewed in the x-direction, are indeed superimposed on the virtual image, however, due to the proximity of the eyewear display device 0 to the user, the face is depicted here. Since this is only illuminated externally, it is a comparatively dark area that contributes only a small amount of scattered light, as illustrated by the boundary beam path 302. This is to be evaluated in relation to the comparatively bright line-shaped screen unit 29 in the beam path 301. In the present case, the boundary beam path 302 corresponds to the end position 242 of the assigned beam splitter unit 10.

Furthermore, there is an angular range 322 of light sources 312 that are sufficiently far away from the eyewear display device 0 in the x-direction, the light sources no longer being able to be perceived as scattered light via the scanning beam splitter units 10. The angular range 321 thus remains between the other two angular ranges 323, 322, in which light sources 311 such as external lamps or a bright sky can be located, the light sources being able to potentially make a large contribution to scattered light. In order not to have to rely on a cap as headgear or the like, diaphragms 33, 34 can be used to block said angular range 321, in which the boundary beam path 303 corresponding to the end position 241 leads in the present case. The diaphragms 33, 34 can be designed both as a horizontally formed diaphragm 33 (diaphragm 33 with a diaphragm plane running horizontally in the x-y plane) and/or as a vertically formed diaphragm 34 (diaphragm 34 with a diaphragm plane running vertically in the z-y plane), for example, as a gradient shading directly on the glass of the eyewear display device 0.

FIG. 3B shows that the scattered light problem becomes less relevant for viewing directions downwards, in the negative z-direction, since the scattered light then comes to an increased extent from the facial area of the user and is therefore typically comparatively dark compared to the environment. In addition, it becomes clear here that it is advantageous to arrange the angular range used for the virtual image inclined downwards relative to the horizontal, for example, +20° upwards from the horizontal and −40° downwards from the horizontal.

In FIG. 3C, it is visualized that the diaphragm 33, 34 is particularly relevant when the eye 20 is pointing upwards, since the beam paths 302, 303 then both lead into the angular range 321. A comparatively small diaphragm 33, 34 is sufficient here to effectively reduce scattered light.

The scattered light observation also shows that it is advantageous to select a relatively low reflectance for the beam splitter units 10 and to increase the luminosity of the line-shaped screen unit 29 rather than, conversely, to select a low-luminosity screen unit 29 in combination with high reflectance of the beam splitter units 10. This results in an increased contrast compared to scattered light and, in addition, greater transparency when looking through real objects in the natural environment of the user.

FIGS. 4A-4C show a variant in which the beam splitter units 10 have been divided into two different groups 411, 412, which all oscillate at the same scanner frequency, but the beam splitter units 10 in one group 411 have a phase shift relative to the beam splitter units 10 in the other group 412. The line-shaped screen unit 29 is thus never viewed across two adjacent beam splitter units 10 at the same time. The computer-generated image information of the line-shaped screen unit 29 can thus be generated individually for each beam splitter unit 10. This results in the advantages of being able to correct manufacturing tolerances, kinematic deviations and further errors by software. For example, beam paths 226 that are not focused to infinity can thus also be realized and, for example, the above lens elements 283, 284 can thus be dispensed with. This also results in the possibility of arranging a plurality of line-shaped screen units 291, 292, 293 (FIG. 4b) at different distances in order to solve the so-called vergence-accommodation problem.

FIG. 4A shows how beam splitter units 10 can be divided into two alternating groups 411, 412, that is, into two groups 411, 412, which each consist of beam splitter units 10 that are not immediately adjacent and together contain all beam splitter units 10. Within the respective group 411, 412, the beam splitter units 10 are in phase and thus aligned parallel to one another with their partially transparent reflection surfaces. Both groups 411, 412 also have the same scanner frequency, but their beam splitter units 10 are phase-shifted with respect to one another. In the example shown here, the phase shift is 90°, a sinusoidal oscillation per complete oscillation encompassing 360°. FIG. 4C shows that in this example, a maximum mechanical deflection of the mirrors of ±30° is assumed.

With the two groups 411, 412, the virtual image can effectively be generated individually for each beam splitter unit 10, as explained below. For the sake of clarity, only a single beam splitter unit 10 is depicted as a scanner unit in FIG. 4B. Starting from the screen unit 29, the light is deflected at a maximum angle with beam path 425 down to a minimum angle with resulting beam path 424. Since the pupil 21 only has a comparatively small opening, the beam paths 424 and 425 of the borderline situations are no longer visible to the human eye 20. Only beam paths in which at least a small beam of rays hits the pupil are effectively visible, for example, the beams of rays 422 and 423. This results in an effective scanning range per beam splitter unit 10, which is relevant to the actual image formation and which is smaller than the technically implemented scanning range. In the example shown here, the effective scanning range is ±7° around a rest position of the beam splitter unit 10. Said effective angular range per beam splitter unit 10 can either be designed for a physical pupil size or increased in order to take into account the movement of the eye 20. Because the eye 20 is always realigning itself, the design can be made accordingly by means of an imaginary resulting pupil 21 that is enlarged relative to the real pupil. A further alternative is accordingly the use of an eye tracking sensor 49 (eye tracking). The angular range can thus be measured continuously and the corrections in the screen unit 29 can be continuously adjusted by software. A mixture is preferably used, resulting in the advantage that the pupil 21 of the eye 20 does not have to be measured with too high a precision. Furthermore, an alignment of the beam splitter units 10 can also be continuously readjusted for different users of the eyewear display device 0 in this way. By dividing the beam splitter units 10 into the two groups 411, 412, it can be ensured that the beam paths of different beam splitter units 10 do not overlap in the pupil 21, so that only light from a single beam splitter unit 10 is perceived. In this case, however, the beam splitter units 10 can be arranged at such a small distance from one another in the z-direction that an uninterrupted presentation of the virtual image in the z-direction is nevertheless possible.

FIG. 4C depicts the oscillation cycles of the two groups 411, 412 as plots 451 and 452 of the mechanical angular deflection S (y-axis) over the phases of the oscillation P as (x-axis). The area with height 44 (direction of the y-axis) and width 43 (direction of the x-axis) marks the (ideally only) times at which the screen unit 29 is switched on, that is, the light is emitting. Due to the phase shift, the plot 452 of the second group 412 has mechanical angular deflections in the range 47 at these times. Said deflections are so large that no beam paths lead from the screen unit 29 to the eye 20 or to the pupil 21. The phase shift between the two groups 411 and 412, and the maximum mechanical (angular) deflection is selected such that there is a period in time in which no beam path can be seen, namely the angular range 46 and the phase range 48. This period of time can be structurally reduced to zero by the fact that the beam paths of the second group 412 become visible at the point in time at which the beam paths of the first group 411 are no longer visible, in which the phase region 48 is minimized.

In the present case, in FIG. 4A, a larger mechanical scanning range, a larger angular deflection, is used than would be necessary for deflecting the light from the screen unit 29 into the pupil 21. This has the advantage that an approximately linear relationship between angular deflection S and phase P is achieved in the effective range 43, 44, that is, an approximately constant scanning speed. The screen unit 29 can thus be operated with approximately constant brightness. Alternatively, a constant intensity for the virtual image can be achieved by correcting the deviations resulting from the sinusoidally varying scanning speed by dynamically adjusting the brightness in the screen unit 29.

FIGS. 5A-5E show different embodiments of a line-shaped screen unit. The line-shaped screen unit is formed in all partial figures with the main extension direction in the y-direction, for example, by arranging 4000 or another number of pixels 51 next to one another. In order to enable coloring, red, green and blue pixels R, G, B are used, preferably in the form of LEDs, for example, so-called micro-LEDs. In this case, it is necessary for the individual pixels 51 to be switchable very quickly. Namely, if 2000 (virtual) pixels are to be generated as a virtual image with the scanning in the scanning direction 52, for example, vertically, that is, corresponding to the x-direction in the figures, and the beam splitter units 10 have a scanner frequency of 45 Hz, that is, two scanning processes at 90 Hz each result for each virtual pixel, then the LEDs must be switched with 2000*90 Hz=180 kHz. In addition, it may be necessary to regulate the brightness, typically at a resolution of 8 bits, for example, by not lighting the respective LED for the entire scan time, but only for a shorter time. The shortest pulse width for lighting up the LED is then correspondingly shorter by a factor of 256, which corresponds to a switching frequency of 46 MHz. Alternatively, however, the intensity can also be regulated via an absolute current instead of via the pulse width of the activity of the LED. Alternative display technologies that can be switched sufficiently quickly can also be used. These include, for example, lasers, which are projected onto a line of the screen unit 29 via a MEMS mirror.

Figure 5A:
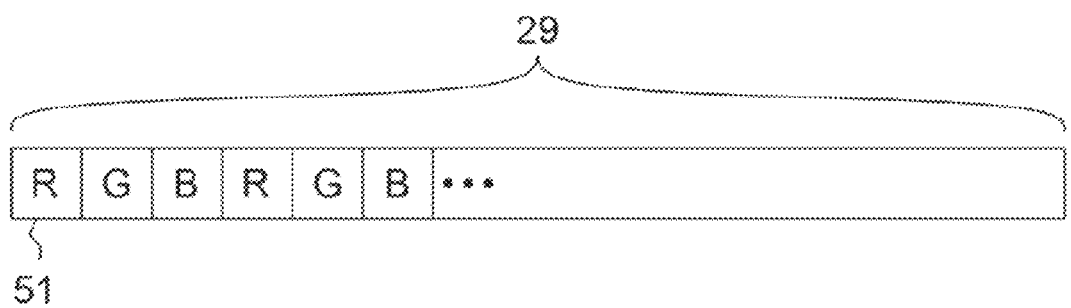
Figure 5B:
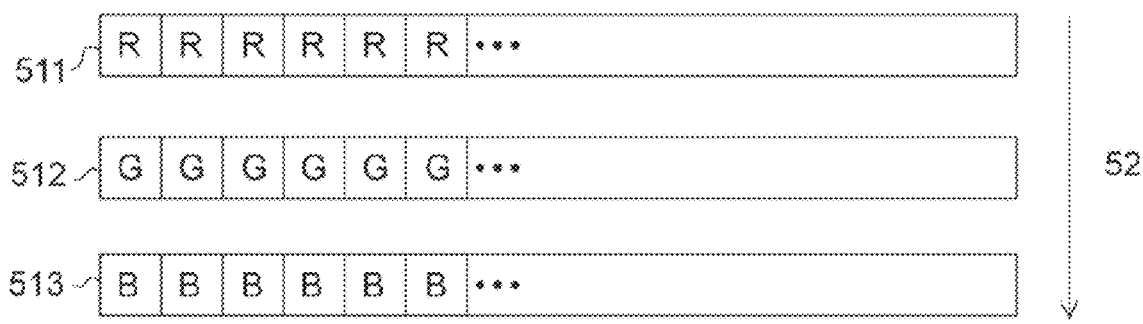

In FIG. 5A, a one-line arrangement is correspondingly shown, in which pixels 51 of the respective colors R, G, B are arranged next to one another in the y-direction, thus forming the screen unit 29. In FIG. 5B, the individual pixels of one color are arranged in the form of respective sub-pixel lines 511, 512, 513 having respective color sub-pixels R, G, B at a distance from one another that differs from zero. This is possible since the scanning direction 52 of the beam splitter units 10 sweeps over the sub-pixel lines 511, 512, 513 of different colors with a time offset. If the local offset in the actuation is taken into account in accordance with a temporally offset actuation, the possibility arises for each resulting pixel in the virtual image to display color information as an overlay.

Figure 5C:
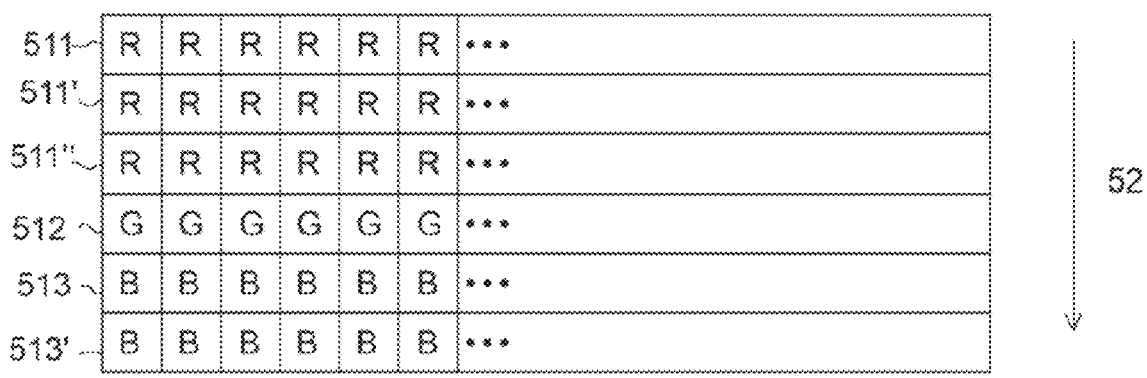

FIG. 5C expands the application options to the effect that a plurality of sub-pixel lines of a respective color R, G, B are presented. A color can be displayed a plurality of times with the aim of making it appear brighter in comparison. This is advantageous, for example, because the intensities of differently colored LEDs are perceived by the human eye as having different spectral brightness. In the illustrated embodiment, the number of sub-pixel lines 511, 511', 511", 512, 513, 513' is selected differently with the aim of being able to represent the white point D65 well.

A further possibility for brightness control is shown in FIG. 5D. The brightness of a pixel to be presented is broken down into so-called bit planes, instances 1-8, as is also known from the actuation of micro-mirror chips from projectors. 8-bit brightness information can also be composed of 8 binary individual images with the brightness 128, 64, 32, 16, 8, 4, 2, 1. Due to the scanning process, said brightnesses can be presented one after the other, since, due to the speed of the scanning process compared to human perception, only the integral of the brightness is recognized. Correspondingly, a distinction must only be made between an on and an off state per pixel, and the brightness can be set globally for the entire line, for example, via an appropriately regulated current. This significantly simplifies the actuation at high frequencies.

With a flexibly switched bit-plane scheme, in which different instances are alternately assigned different levels of brightness, there is also the advantage that the switched LEDs are only ever actuated at maximum power for a short period of time, so that a higher maximum intensity can be achieved for a short time. For this purpose, the bit planes are typically mixed, for example, by implementing a brightness sequence such as 1, 128, 2, 64, 4, 8, 16 for each instance and thus for each line in succession. The flexible specification of the maximum intensity for the respective rows also has advantages for temperature management.

FIG. 5E shows an example of the relationship between the scan direction 52 and the scanning of two sub-pixel lines 511, 512 arranged next to one another in the x-direction by means of the beam splitter units 10.

FIG. 6 now shows the image formation of the virtual image in a further embodiment. In this example, the light of the line-shaped screen unit 29 is imaged to infinity by the lens element 13, that is, parallelized. The light thus impinges on the scanning beam splitter units 10 according to the beam path 226 and is in each case partially reflected and partially transmitted thereby. In the example shown, the portion of light that is always transmitted finally impinges on an absorbing surface 61 of the eyewear display device 0 in order to avoid back reflections. The reflected light is deflected to the eye according to beam path 621. Since each scanning beam splitter unit 10 contributes with its own beam of rays and the scanning beam splitter units 10 are positioned here in a beam splitter distance from one another that varies in the z-direction, the individual beams of rays partially overlap (for example, overlap 631) and an unilluminated gap is partially formed (for example, gap 633). However, only rays that are directed into the pupil 21, that is, that strike the eye 20 within the entrance pupil 632, are relevant and effective. Since the beam path 226 is focused to infinity and said beam path still passes through the concave lens 283 in the example shown after its reflection at the beam splitter units 10, a virtual image appears as if it had been created at a certain distance according to the beam path 622 or 623. For a pixel 51 that is displayed per unit of time in the line-shaped screen unit 29, the human eye 20 sees a virtual pixel 651 as if a corresponding real pixel were present in the field of view of a user.

Since the partially transparent beam splitter units 10 are moveably mounted as scanner units, a two-dimensional virtual image can be constructed from a line-shaped screen unit 29. If the beam splitter unit 10 moves in the direction 52, the beam path also changes in angle in the direction 52. This has the effect that the line-shaped screen unit 29 can now display new image color and brightness information which can be perceived by the human eye 20 as a virtual pixel 651' in a new position, that is, the rest of the image can be built up in the scanner direction 52. For this, it is necessary for the line-shaped screen unit 29 to be actuated in a synchronous manner depending on the position of the scanning beam splitter unit 10. Accordingly, there is a sensor system that can determine the position of the beam splitter units 10 with sufficient accuracy. Said sensor system can be integrated in the beam splitter units 10 or in another control unit. The line-shaped screen unit 29 can be actuated accordingly by a control unit 68 which is arranged either externally on the eyewear display device 0 or by cable or by radio or is coupled to the eyewear display device 0.

If the illusion of a stationary virtual object is to be created in a real environment, the position of the eyewear display device 0 in space must also be determined. A corresponding tracking unit 67 (tracking sensor system) can be used for this purpose. This can comprise, for example, a camera fixedly connected to the eyewear display device 0, said camera, in cooperation with the computing unit 68, making it possible to calculate the virtual image such that it appears statically anchored in space.

In the present case, the further lens element 13 is implemented as a section through a lens. This results in two plane-parallel boundary surfaces 66, which allow a further person 200 to look through the further lens element 13 without significant distortions of what is occurring behind them. The further lens element 13 thus has only a small influence on the aesthetic appearance of the eyewear display device 0 and enables a design that at least comes close to ordinary glasses.

FIGS. 7A-7C show an illustration of an embodiment of a eyewear display device having rotary scanner units. There, the beam splitter units 10 are designed as rotary scanner units and not as oscillation scanner units as in the above examples. The features not explained can correspond to the features explained for the other examples.

In the embodiment shown in FIG. 7A, the beam splitter units 10 rotate about the axis of rotation 24 at a constant angular velocity and thus a uniformly defined scanner or rotation frequency. Due to the optical boundary conditions with regard to the relative arrangement of the beam splitter units 10 to one another and to the screen unit 29, the rotary scanner units cannot rotate in the same direction and phase-synchronously, since the beam splitter units 10 would otherwise touch. The beam splitter units 10 are therefore divided into two groups 411, 412, each with opposite directions of rotation. As in the examples having oscillation scanner units, the reflection surfaces of the beam splitter units 10 move in phase within the groups 411, 412, that is, are parallel to one another throughout.

FIG. 7B shows the detail 73 from FIG. 7A over a movement period of 180° in 10° increments. From above, that is, in the negative z-direction, only one beam splitter unit 10 always reflects towards the eye 20 or into the pupil 21. In steps 741, the beam splitter unit 10 used to deflect the light of the screen unit 29 is the upper beam splitter unit 10 in the figure. In steps 742, the beam splitter unit 10 used to deflect the light of the screen unit 29 is the lower beam splitter unit 10' in the figure. In the remaining steps, which are not specified in more detail, the screen unit 29 can remain switched off, for example, since light from the screen unit 29 does not reach the pupil anyway in the respective configurations of the beam splitter units 10, 10'. The effect of the "shining eyes" can also be avoided in this way, in which light from the screen unit 29 is directed to someone opposite or to a conversation partner.

When designing, it should be noted that the distance 76 between the next adjacent beam splitter units 10, 10' is chosen to be sufficiently large so that there is no contact during a complete rotation. For example, the beam splitter units 10 come very close in detail 75, but do not touch. For aerodynamic reasons, it makes sense to avoid bringing the mirrors closer together, as shown in detail 75, and to provide a sufficiently large residual gap.

Alternatively, a partially transparent beam splitter unit 10 is shown in FIG. 7C, which has a comb-like geometry in cross-section relative to the axis of rotation 24. Instead of a rectangular shape 77, intermediate spaces 76 are allowed. In this case, the beam splitter units 10 could engage in one another without mutual damage if the comb-like structure of adjacent beam splitter units 10 is offset from one another. The possibility of structuring the beam splitter units 10 geometrically is analogous to a polka-dot beam splitter that is not coated over its entire surface, since reflectances of approximately 30% or less are already sufficient for a functioning eyewear display device 0. If the beam splitter units 10 comprise comb-like structures as shown in FIG. 7C, the reflection surface should have a constant reflectance on average. For example, if the comb-like structures become thinner towards the edges 261, 262, the reflectance at the comb tips must be increased there accordingly.

The invention claimed is:

1. An eyewear display device for displaying a virtual image in a field of view of a user, comprising
   a frame unit;
   a line-shaped screen unit attached to the frame unit for emitting light as computer-generated image information in a first direction; and
   at least two partially transparent beam splitter units attached to the frame unit, which are designed to be operated as scanner units at a uniformly defined scanner frequency, for deflecting the light emitted in the first direction from the screen unit into a second directional range corresponding to the field of view of the user when the eyewear display device is utilized as intended.

2. The eyewear display device according to claim 1, wherein
   the beam splitter units are designed to rotate or oscillate with a respective reflection surface about an axis of rotation running transversely to the first direction.

3. The eyewear display device according to claim 2, wherein the beam splitter units are designed as oscillation scanner units, the reflection surface of which oscillate about the axis of rotation when utilized as intended.

4. The eyewear display device according to claim 2, wherein the beam splitter units are designed as rotary scanner units, the reflection surfaces of which rotate about the axis of rotation.

5. The eyewear display device according to claim 1, wherein the beam splitter units are designed to be in a predetermined phase relationship to one another during operation at the uniform scanner frequency.

6. The eyewear display device according to claim 1, wherein the beam splitter units are arranged one behind the other when viewed in a vertical direction, so that light emitted by the screen unit impinges on a respective beam splitter unit where the light has previously passed through those of the other beam splitter units which are arranged between the respective beam splitter unit and the screen unit.

7. The eyewear display device according to claim 1, wherein the first direction, when the eyewear display device is utilized as intended, is the vertical direction, and the line-shaped screen unit is arranged in the vertical direction above the beam splitter units.

8. The eyewear display device according to claim 1, wherein the length as the main extension direction of the line-shaped screen unit is at least one order of magnitude greater than a width of the line-shaped screen unit running transversely to the length.

9. The eyewear display device according to claim 1, wherein the line-shaped screen unit comprises a pixel line of pixels which are each formed by different color sub-pixels arranged alternately along the line.

10. The eyewear display device according to claim 1, wherein the line-shaped screen unit comprises a plurality of sub-pixel lines of respective color sub-pixels, wherein each sub-pixel line is assigned a specific color.

11. The eyewear display device according to claim 1, wherein the pixel line or the sub-pixel lines of the line-shaped screen unit each are implemented in the form of respective instances a plurality of times, and each instance of the pixel line or sub-pixel line is designed to be operated at a maximum brightness that is specifically different for each instance.

12. The eyewear display device according to claim 1, wherein a plurality of line-shaped screen units running at least substantially parallel in their respective main extension direction are attached to the frame unit, the line-shaped screen units each being arranged at a different distance from the beam splitter units in the vertical direction.

13. The eyewear display device according to claim 1, wherein a lens element is arranged between the beam splitter units and an eye position which is occupied by an eye of the user when the eyewear display device is utilized as intended; and/or a lens element is arranged between the beam splitter units and an environment which can be viewed by the user through the beam splitter units when the eyewear display device is utilized as intended.

14. The eyewear display device according to claim 1, wherein a further lens element is arranged between the beam splitter units and the screen unit.

15. The eyewear display device according to claim 14, wherein the further lens element comprises two plane-parallel boundary surfaces running along the first direction.

16. The eyewear display device according to claim 1, wherein a diaphragm unit is attached to the frame unit, the diaphragm unit being designed with a diaphragm running transversely to the first direction and/or with a diaphragm running parallel to a plane spanned by the beam splitter units, to shield light which is deflected by the beam splitter units against light incident from directions adjacent to the first direction.

\* \* \* \* \*